US009951856B2

(12) United States Patent
Inui

(10) Patent No.: US 9,951,856 B2
(45) Date of Patent: Apr. 24, 2018

(54) BI-METALLIC SPROCKET, AND METHOD OF MAKING SAME

(71) Applicant: HONDA MOTOR CO., LTD., Minato-Ku, Tokyo (JP)

(72) Inventor: Shujiro Inui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 121 days.

(21) Appl. No.: 14/604,930

(22) Filed: Jan. 26, 2015

(65) Prior Publication Data
US 2015/0211623 A1    Jul. 30, 2015

(30) Foreign Application Priority Data
Jan. 28, 2014    (JP) ................................. 2014-013141

(51) Int. Cl.
*F16H 55/30* (2006.01)
*B23K 26/20* (2014.01)
*B23K 15/00* (2006.01)

(52) U.S. Cl.
CPC ......... *F16H 55/30* (2013.01); *B23K 15/0046* (2013.01); *B23K 26/20* (2013.01)

(58) Field of Classification Search
CPC ..... F16H 55/36; B23K 15/0046; B23K 26/20; B23K 15/008; B23K 26/323; B62M 9/10
USPC ........................................................ 474/152
See application file for complete search history.

(56) References Cited

U.S. PATENT DOCUMENTS

| 6,441,335 | B1 * | 8/2002 | Nagaoka | B23K 15/008 219/121.14 |
| 2003/0008742 | A1 * | 1/2003 | Kay | F16H 57/0025 474/182 |
| 2004/0110590 | A1 * | 6/2004 | Renshaw | B62M 9/10 474/152 |
| 2005/0242067 | A1 * | 11/2005 | Bernhardt | B23K 15/00 219/121.14 |
| 2007/0173364 | A1 * | 7/2007 | Renshaw | F16H 55/30 474/160 |
| 2010/0081530 | A1 * | 4/2010 | Crump | B21K 1/30 474/152 |
| 2013/0094897 | A1 * | 4/2013 | Vosters | B23K 15/0006 403/270 |
| 2014/0061185 | A1 * | 3/2014 | Schindele | B23K 20/128 219/617 |
| 2015/0093595 | A1 * | 4/2015 | Asakawa | C10M 107/38 428/640 |

(Continued)

FOREIGN PATENT DOCUMENTS

JP    S58-113597 A    7/1983

*Primary Examiner* — William E Dondero
*Assistant Examiner* — Robert T Reese
(74) *Attorney, Agent, or Firm* — Carrier Blackman & Associates, P.C.; Joseph P. Carrier; Jingli Wang

(57) ABSTRACT

A sprocket assembly, formed of dissimilar materials, includes at least one tooth member made of ferrous material and a circular disk made of a light metal such as aluminum or an aluminum alloy. The circular disk supports the tooth member on an outer peripheral surface thereof. The tooth member is dissimilar-metal welded to the circular disk, either by laser welding or by electronic beam welding. Optionally, multiple individual tooth members may be fitted into notches formed in an outer periphery of the circular disk, and welded therein. A method of making a sprocket assembly is also described.

20 Claims, 11 Drawing Sheets

(56) References Cited

U.S. PATENT DOCUMENTS

2015/0094179 A1* 4/2015 Iwai .................. F16H 55/30
474/152

* cited by examiner

VI-VI CROSS SECTION

VI-VI CROSS SECTION (WELDED)

VII-VII CROSS SECTION

BI-METALLIC SPROCKET, AND METHOD OF MAKING SAME

CROSS-REFERENCE TO RELATED APPLICATIONS

The present invention claims priority under 35 USC 119 based on Japanese patent application No. 2014-013141, filed on Jan. 28, 2014. The entire subject matter of this priority document, including specification claims and drawings, is incorporated by reference herein.

BACKGROUND OF THE INVENTION

Technical Field of the Invention

The present invention relates to a sprocket. More particularly, the present invention relates to a sprocket formed from dissimilar materials, including a tooth member formed of ferrous material, and a circular disk, which is formed of a light metal and which supports the tooth member thereon.

Background Art

Conventionally, in a sprocket, a technique of connecting a circular disk with a tooth member by shrinkage fitting of a steel annular member having the tooth member on its periphery on the outer periphery of a circular disk of a light alloy such as aluminum, is known (for example, see Japanese Patent Literature JP-A No. S58-113597). According to JP-A No. S58-113597, it is possible to reduce weight by forming the circular disk with a light alloy, such as aluminum, while forming the tooth member with steel to ensure toughness and abrasion resistance.

However, in the above-described conventional sprocket, as the annular member having the tooth member and the circular disk are connected with a friction force by engagement of the shrinkage fitting, to generate a sufficient friction force by enlarging the area of the connected part, it is necessary to increase the plate thickness of the sprocket, and the weight reduction is limited.

SUMMARY OF THE INVENTION

The present invention has been made in view of the above-described situation, and has an object to, in a sprocket having a tooth member of ferrous material and a circular disk of a light metal, enable further weight saving.

Reference numbers are included in the following description corresponding to the reference numbers used in the drawings. Such reference numbers are provided for illustration and are not intended to limit the invention.

In order to attain the above object, the present invention provides a sprocket having a tooth member (14, 114, 214, 314, 414) formed of ferrous material, and a circular disk (13, 113, 213, 313, 471) that is formed of a light metal and that supports the tooth member (14, 114, 214, 314, 414), in which the tooth member (14, 114, 214, 314, 414) is abutted on an outer peripheral surface (18, 118, 218, 318, 418) of the circular disk (13, 113, 213, 313, 471), and is dissimilar-metal welded to the circular disk (13, 113, 213, 313, 471) by laser welding or electronic beam welding.

According to the present invention, it is possible to obtain high welding strength in an abutment part between the tooth member of ferrous material and the circular disk of a light metal by laser welding or electronic beam welding. Accordingly, it is not necessary to increase the plate thickness of the sprocket to increase the bond strength, and it is possible to further reduce the weight of the sprocket.

Further, in the present invention, the tooth member (114, 214, 314) provided in a plurality of positions are formed as separate bodies, and welded to the circular disk (113, 213, 313).

According to the present invention, it is possible to reduce the volume of the tooth member formed of ferrous material, and it is possible to attain weight saving.

Further, in the present invention, a welded part (225) between the circular disk (213) and the tooth member (214) has a distance in a radial direction of the circular disk (213).

According to the present invention, as a welded part between the circular disk and the tooth member has a distance in a radial direction of the circular disk, it is possible to obtain sufficient bond strength even when the weld length is shortened.

Further, in the present invention, welded parts (325a, 325b) between the circular disk (313) and the tooth member (314) are formed on a plurality of circles (C1, C2) which are coaxial to the sprocket and which have mutually different diameters.

According to the present invention, it is possible to improve the bond strength and it is possible to simplify weld feed direction. Accordingly, it is possible to perform welding with improved facility.

Further, in the present invention, the tooth member (14, 114, 214, 314, 414) and the circular disk (13, 113, 213, 313, 471) are formed by punching by stamping or press-working, and the tooth member (14, 114, 214, 314, 414) and the circular disk (13, 113, 213, 313, 471) are provided in orientations in which punching directions in the stamping or press-working correspond with each other, further, the laser or electronic beam is emitted from the side of shear drops (113a, 114a) in the stamping or press-working.

According to the present invention, it is possible to prevent reflection of laser or electronic beam entered the abutment part from the shear drop side to the outside, and it is possible to perform welding while effectively multipath-reflecting the laser or electronic beam. Accordingly, it is possible to save welding energy and it is possible to reduce welding time.

Advantages of the Invention

In the sprocket according to the present invention, it is not necessary to increase the plate thickness of the sprocket to increase the bond strength between the tooth member and the circular disk, and it is possible to further reduce the weight of the sprocket.

Further, it is possible to reduce the volume of the tooth member of ferrous material, and it is possible to attain weight saving.

Further, in manufacturing the sprocket assembly hereof, it is possible to obtain sufficient bond strength even when the weld length is shortened.

Further, in manufacturing the sprocket assembly hereof, it is possible to simplify the weld feed direction and it is possible to perform welding with greater facility.

Further, in manufacturing the sprocket assembly hereof, it is possible to save welding energy, and it is possible to reduce welding time.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

First Embodiment

Figure 1:
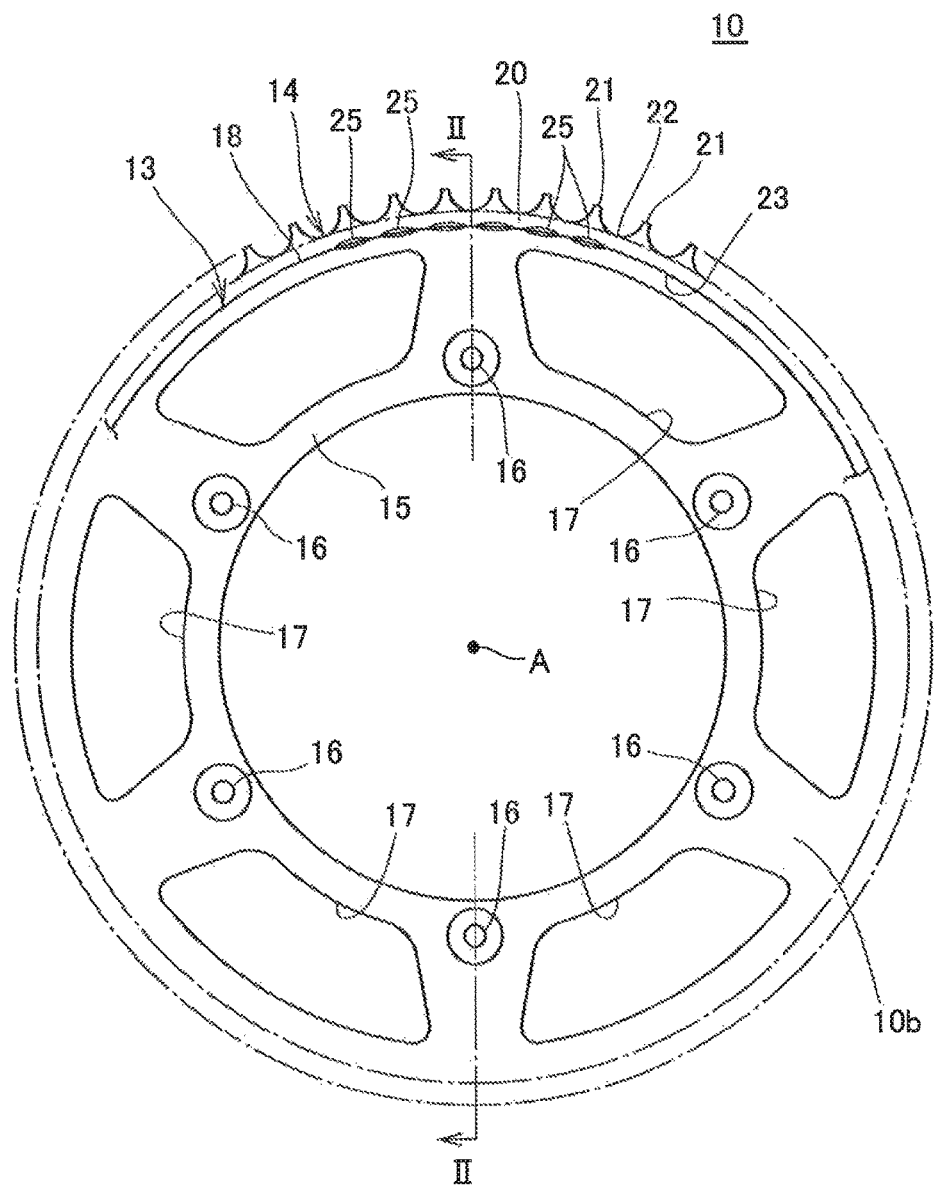
FIG. 1 is a front plan view of a sprocket assembly according to a first embodiment of the present invention.
Figure 2:
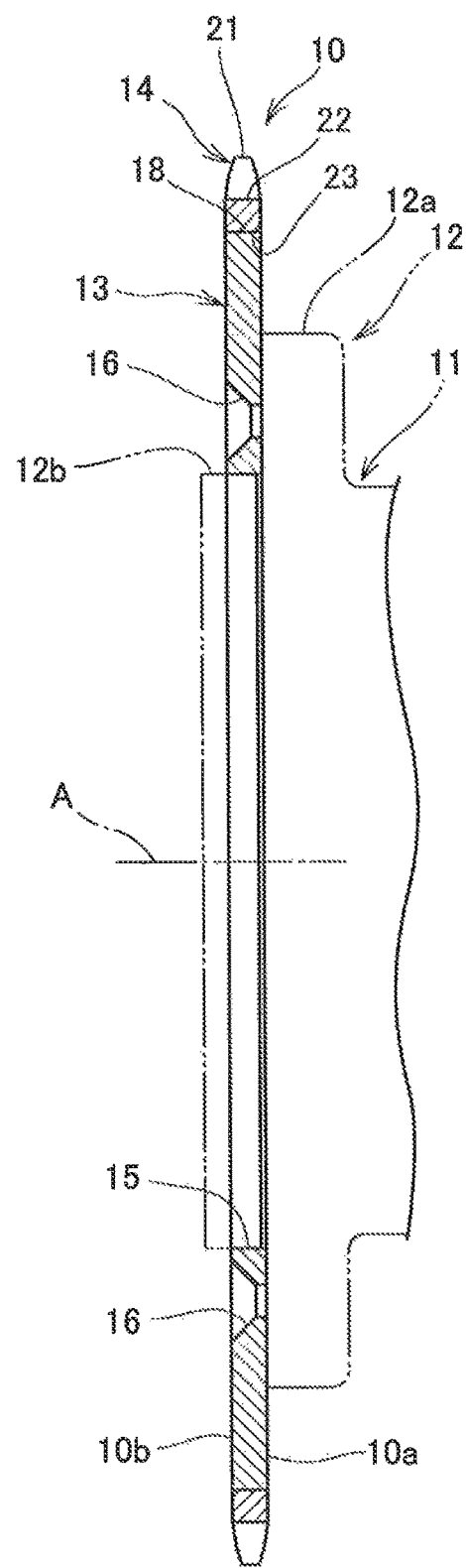
FIG. 2 is a cross-sectional view of the sprocket assembly of FIG. 1, taken along the line II-II.

FIG. 1 is a front plan view of a sprocket assembly according to a first embodiment of the present invention. FIG. 2 is a cross-sectional view of the sprocket assembly of FIG. 1, taken along the line II-II. The sprocket assembly 10 may also be referred to herein as a sprocket 10.

The sprocket 10 may be used as a driven sprocket provided on a rear wheel of a vehicle, such as a driving wheel of a motorcycle (not shown). The motorcycle has a driving sprocket (not shown) provided on an engine output shaft, the sprocket 10, and an endless loop driving chain (not shown) put between the driving sprocket and the sprocket 10. Engine torque output is transmitted to the sprocket 10 via the driving sprocket and the driving chain, and the rear wheel is rotated integrally with the sprocket 10. The driving chain is a roller chain which may be formed of a ferrous material such as carbon steel.

As indicated with an alternate long and two short dashes line in FIG. 2, the wheel of the rear wheel has a hub 11 through which the axle of the rear wheel is inserted, and the hub 11 has a sprocket fixing part 12 to which the sprocket 10 is attached. The sprocket fixing part 12 has a flange 12a to receive the sprocket 10 in an axial direction of the axle and a boss 12b fitted in the inner peripheral section of the sprocket 10.

The sprocket 10 has a disk-shaped circular disk 13 attached to the sprocket fixing part 12, and an annular tooth ring member 14 connected to the outer periphery of the circular disk 13. Note that since the tooth ring member 14 has a plurality of similarly-shaped pieces over the entire perimeter, only a part of the shape of the tooth ring member 14 is shown and the remaining part is omitted in FIG. 1.

Further, the sprocket 10 has an inner surface 10a on the side intended for placement in contact with the flange 12a, and an outer surface 10b on the opposite side to the inner surface 10a. The inner surface 10a and the outer surface 10b are approximately parallel to each other approximately over the entire sprocket 10, and the sprocket 10 is an approximately flat plate.

The circular disk 13 is formed of an aluminum alloy. Note that the circular disk 13 may be formed of any light metal. As the light metal, for example, an aluminum alloy, a magnesium alloy and a titanium alloy, pure aluminum, or pure titanium may be used.

The circular disk 13 has a central hole 15 provided at the center thereof for sliding engagement with the outer periphery of the boss 12b. The circular disk 13 also has a plurality of intermediate fixed holes 16 provided therein around the peripheral edge of the central hole 15 at approximately equal intervals in a circumferential direction, and a plurality of lightening holes 17 provided between the respective adjacent fixed holes 16.

Further, as shown in FIGS. 1 and 2, a central axis line of the sprocket 10 is an axis line A of the central hole 15. The sprocket 10 is positioned by engagement of the central hole 15 with the boss 12b, and is fastened to the flange 12a with appropriate fixing bolts (not shown) inserted through the fixed holes 16.

The circular disk 13 has an outer peripheral surface 18 to which the toothed ring member 14 is welded. The outer peripheral surface 18 of the circular disk 13 has an approximately complete round shape as seen in a front plan view, and its surface extends approximately in parallel to the axial direction of the axis line A.

The circular disk 13 is formed in a disk shape by punching a plate material with a die by stamping or press-working. The outer peripheral surface 18 of the circular disk 13 is also formed by stamping or press-working.

Figure 3:
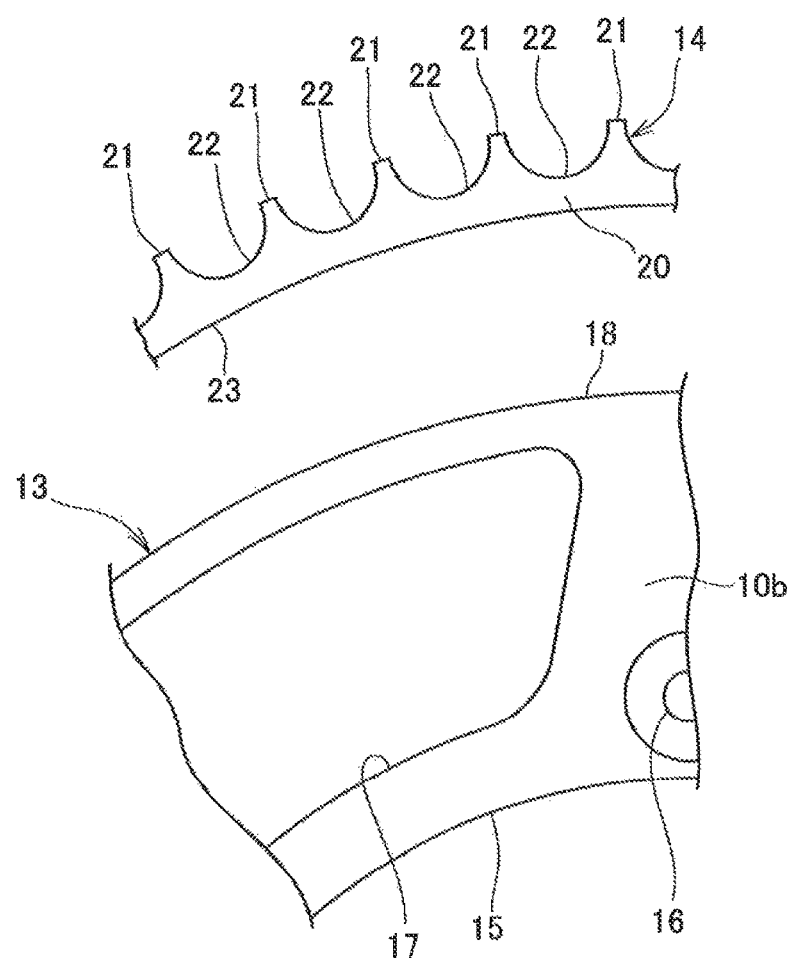
FIG. 3 is an exploded detail plan view of the sprocket assembly of FIGS. 1-2, partially cut away and showing a part of a circular disk and tooth member in a stage prior to welding.

FIG. 3 is an exploded detail plan view of the sprocket assembly of FIGS. 1-2, partially cut away and showing a part of a circular disk and tooth member in a stage prior to welding.

As shown in FIGS. 1 to 3, the toothed ring member 14 includes a ring-shaped annular member 20 connected to the outer peripheral surface 18 of the circular disk 13, and a plurality of teeth 21, integrally formed with the annular member 20 and projected radially outwardly from the outer periphery of the annular member 20.

The teeth 21 are radially provided on the outer periphery of the annular member 20 at approximately equal intervals in the circumferential direction. As shown in FIG. 3, arcuate recesses 22 are formed between the adjacent respective teeth 21. The rollers of the above-mentioned driving chain fit into the arcuate recesses 22, and are sequentially engaged with the teeth 21.

The annular member 20 has an inner peripheral surface 23 having an approximately complete round shape in a plane view. The inner peripheral surface 23 extends approximately in parallel to the axial direction of the axis line A. The inner peripheral surface 23 is a surface abutted on the outer peripheral surface 18 of the circular disk 13 in the radial direction and is welded thereto, and the its inner diameter is equal to, or slightly greater than the outer diameter of the outer peripheral surface 18.

The toothed ring member 14 is formed of ferrous material such as carbon steel. The toothed ring member 14 is formed in an annular shape by punching a plate material by stamping or press-working. The inner peripheral surface 23 is formed by stamping or press-working. The plate thickness of the toothed ring member 14 is approximately equal to the plate thickness of the circular disk 13.

Figure 4:
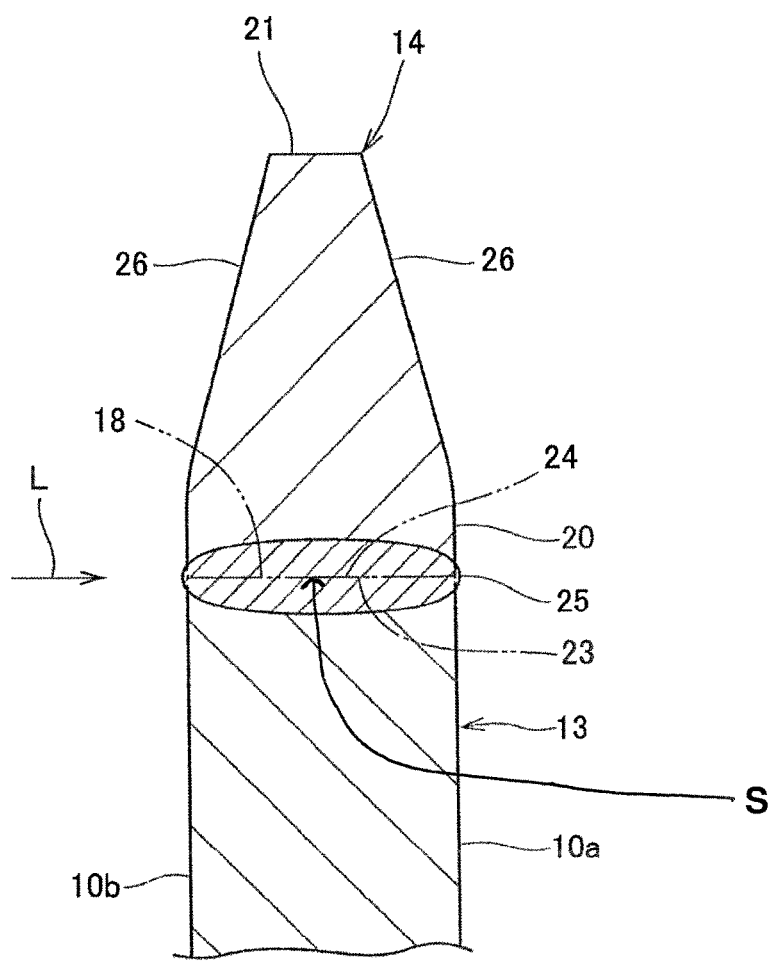
FIG. 4 is an enlarged cross-sectional detail view of a welded part of the sprocket assembly of FIG. 2.

FIG. 4 is an enlarged cross-sectional detail view of a welded part of the sprocket assembly of FIG. 2.

Here a procedure of welding the toothed ring member 14 to the circular disk 13 will be described with reference to FIGS. 1 to 4.

First, the inner peripheral surface 23 of the toothed ring member 14 is closely fitted outside of the outer peripheral surface 18 of the circular disk 13, with which an abutment part 24 abutted on the inner peripheral surface 23 and the outer peripheral surface 18 is formed.

Next, laser light L approximately parallel to the axis line A is emitted with a laser welding machine from one direction on the abutment part 24, and the laser light enters a minute clearance S in the abutment part 24. With this operation, the inner peripheral surface 23 of ferrous material and the outer peripheral surface 18 of aluminum alloy are blended with each other in the abutment part 24, and dissimilar-metal welding is made between the circular disk 13 and toothed ring member 14.

The welded part or weld bead 25, where the inner peripheral surface 23 and the outer peripheral surface 18 are blended with each other, extends in the plate-thickness direction, and is provided at multiple locations around the sprocket 10, as shown in FIG. 1.

It is possible to firmly join the ferrous material and the aluminum alloy by laser welding, because it is possible to obtain high energy density by convergence of the laser light in a minute spot.

In this manner, as the toothed ring member 14 is firmly welded to the circular disk 13 by laser welding, it is possible to obtain sufficient joint strength even when the plate thickness of the circular disk 13 and that of the toothed ring member 14 are not thick, and it is possible to reduce the weight of the sprocket 10.

As shown in FIG. 1, the welded part of the abutment part 24 only corresponds to the tooth 21, and no weld bead 25 is formed in a part of the sprocket 10 corresponding to the arcuate recess 22. In this manner, as the weld bead 25 is provided in the part corresponding to the large volumed tooth 21 and welding is not made in part corresponding to the small volumed arcuate recess 22, it is possible to reduce the thermal effect by welding on the toothed ring member 14. Further, as it is possible to reduce the welded parts, it is possible to save energy and reduce welding time. Optionally, if desired, the weld bead 25 may be continuously formed over the entire periphery of the abutment part 24.

Further, as the weld bead 25 is formed on the abutment part 24 having an approximately complete round shape in a plane view, the torch of the laser welding machine is circularly moved, or the sprocket 10 is rotated about the axis line A with respect to the torch of the fixed laser welding machine. It is therefore easy to control laser weld feeding.

After the laser welding, parts of the weld bead 25 projected to the inner surface 10a and the outer surface 10b of the sprocket 10 are eliminated by machine work. Thereafter, a pair of tapered side edges (slope parts) 26, 26 of each of the teeth 21 are formed by machine work in the toothed ring member 14. The toothed ring member 14, in which the slope parts 26, 26 are formed, has a shape convergent in the plate thickness direction on the end side.

As described above, according to the first embodiment to which the present invention is applied, the sprocket 10 has the toothed ring member 14 formed of ferrous material and the circular disk 13 which is formed of an aluminum alloy as a light metal and which supports the toothed ring member 14, and the toothed ring member 14 is abutted on the outer peripheral surface 18 of the circular disk 13 and is dissimilar-metal welded by laser welding to the circular disk. Accordingly, it is possible to obtain high welding strength in the abutment part 24 between the toothed ring member 14 and the circular disk 13 by laser welding. Therefore, it is not necessary to increase the plate thickness of the sprocket 10 to increase the bond strength, and it is possible to reduce the weight of the sprocket 10.

Second Embodiment

A second embodiment to which the present invention is applied will be described below with reference to FIGS. 5 to 7. In the second embodiment, elements formed as in the case of the above-described first embodiment have the same reference numerals, and the explanations thereof will be omitted.

In the above-described first embodiment, the toothed ring member 14 has the annular member 20 having the teeth 21 integrally formed thereon. In contrast, in the second embodiment, the difference from the above-described first embodiment is that respective tooth members 114 are individually formed as separate bodies.

Figure 5:
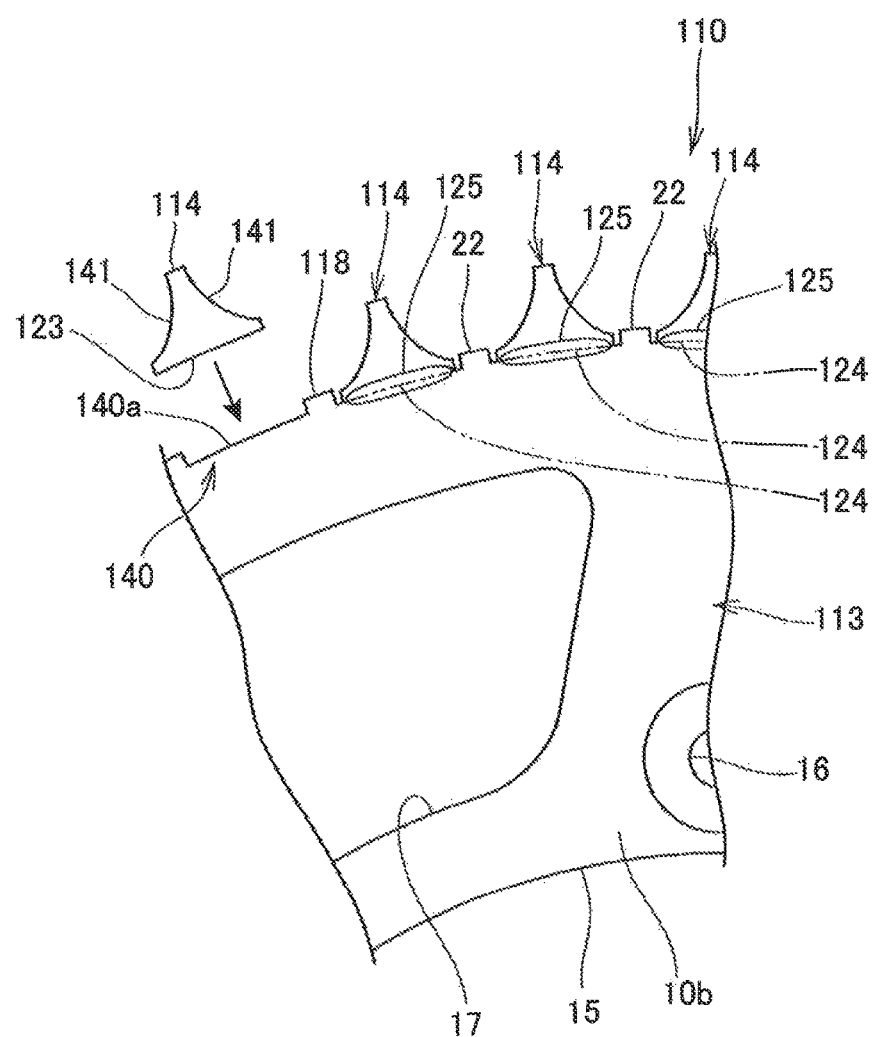
FIG. 5 is a partially expanded detail plan view of a part of the sprocket assembly in accordance with a second embodiment of the present invention.
Figure 6A:
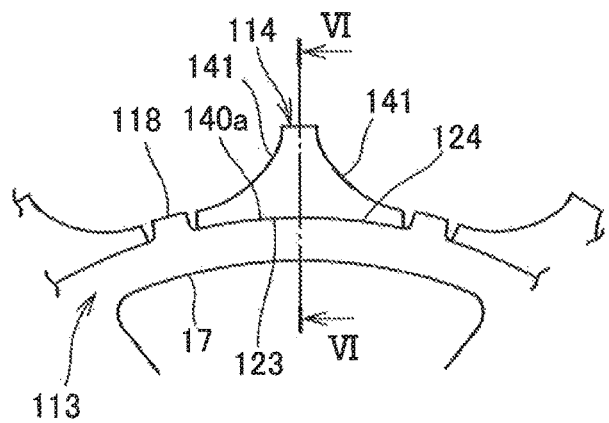
FIGS. 6A-6E illustrate a sequence of steps in a process of manufacturing the sprocket assembly of FIG. 5.
Figure 6B:
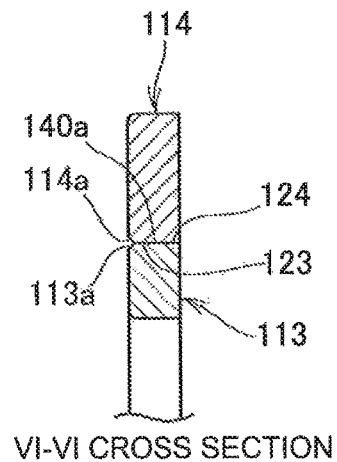
Figure 6C:
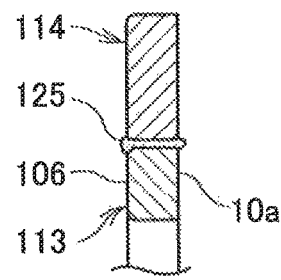
Figure 6D:
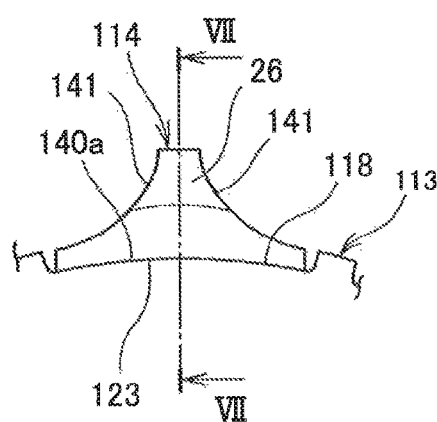
Figure 6E:
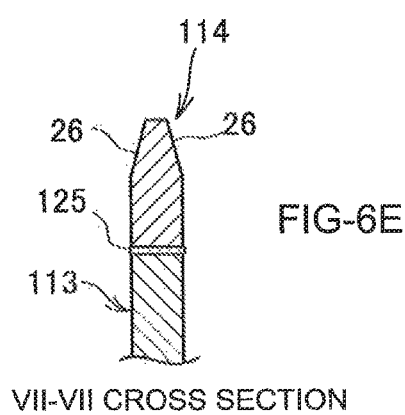

FIG. 5 is a partially expanded detail plan view of a part of the sprocket assembly in accordance with a second embodiment of the present invention.

The sprocket 110 has a circular disk 113 having a plurality of recessed notches 140 formed therein, and the plurality of tooth members 114 are connected to the outer periphery of the circular disk 113 at the respective notches. The circular disk 113 is formed of a light metal such as an aluminum alloy. The circular disk 113 has the central hole 15, the fixed holes 16, and the lightening holes 17 formed therein in a manner similar to that described herein in connection with the first embodiment.

The circular disk 113 has an outer peripheral surface 118 to which the tooth members 114 are fixed by welding. The outer peripheral surface 118 has an approximately round shape in a front plan view, and its surface extends approximately in parallel to the axial direction of the axis line A.

The outer peripheral surface 118 has a plurality of notches 140 formed therein and recessed by one step inward in the radial direction from the outermost periphery thereof. The notches 140 are formed in a plurality of positions in the outer peripheral surface 118 over the entire periphery at approximately equal intervals in the circumferential direction, and the tooth members 114 are welded to the respective notches 140. A bottom surface 140a of the notch 140, to which the tooth member 114 is welded, is provided on the identical virtual circle with the axis line A as a center, and the respective bottom surfaces 140a may be formed in an arc shape.

The circular disk 113 is formed in a disk shape by punching a plate material by stamping or press-working. The outer peripheral surface 118 is formed by stamping or press-working.

The tooth member 114 is formed in an approximately triangular shape in a plane view, and has a welded surface 123 welded to the bottom surface 140a of the outer peripheral surface 118, and a pair of concave tooth surfaces 141, 141 which abut on the roller of the driving chain. The welded surface 123 is formed in an arc shape along the shape of the bottom surface 140a. The bottom surface of the arcuate recess 22 is formed between adjacent tooth members 114.

The tooth member 114 is formed of ferrous material such as carbon steel. The respective tooth members 114 are formed as separate bodies by punching, by stamping, or by press-working with a die.

FIGS. 6A-6E illustrate a sequence of steps in a process of manufacturing the sprocket assembly of FIG. 5.

During preparation for welding of the tooth member 114, first, the tooth member 114 is fitted in the appropriate notch 140 of the circular disk 113, by which an abutment part 124 abutted on the welded surfaces 123 of the tooth members 114 and the bottom surfaces 140a is formed. At this time, the tooth member 114 and the circular disk 113 are arranged in orientations such that the punching directions of stamping or press-working correspond with each other. That is, in the abutment part 124, the tooth member 114 and the circular disk 113 are arranged such that a shear drop member 114a(shear drop) in the stamping or press-working of the tooth member 114 and a shear drop member 113a(shear drop) in the stamping or press-working of the circular disk 113, face each other.

Further, as it is possible to position the tooth member 114 in the circumferential direction and in the radial direction by fitting the tooth member 114 in the notch 140, it is possible to perform welding with facility.

Figure 7:
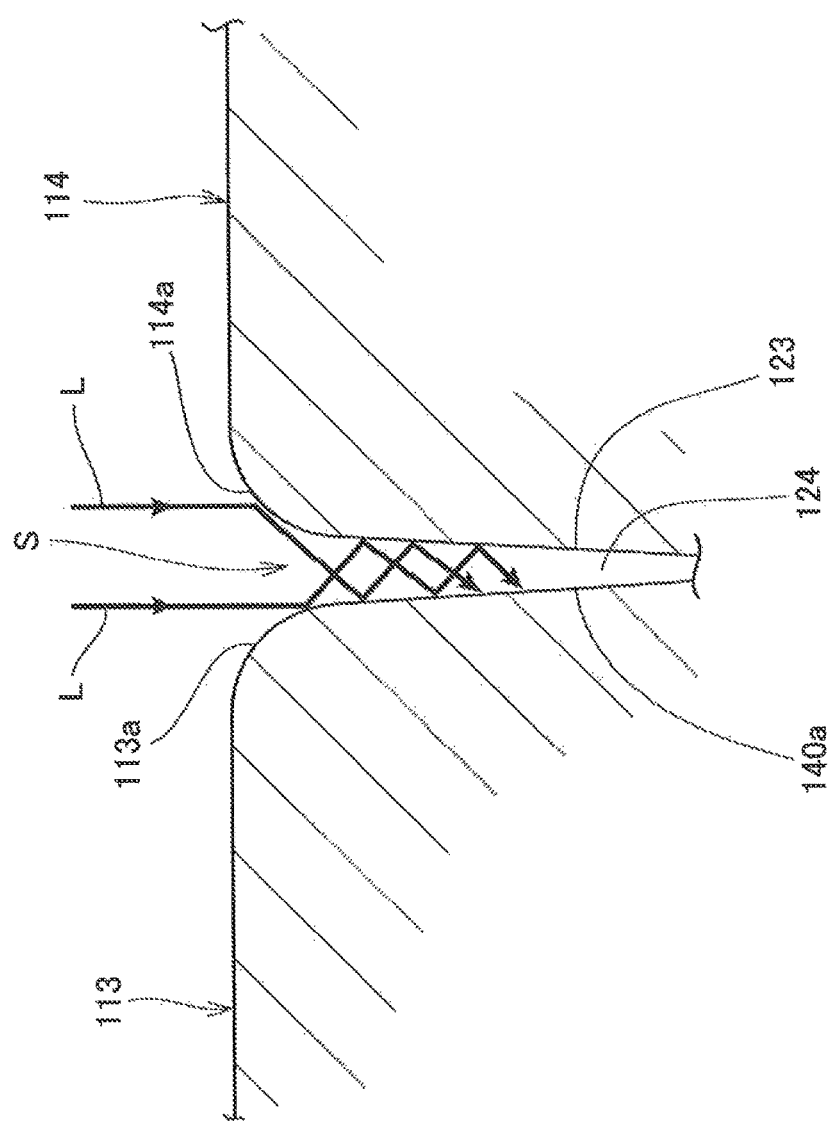
FIG. 7 is an enlarged cross-sectional detail view of an abutment part of the sprocket assembly of FIG. 6.

FIG. 7 is an enlarged diagram of the abutment part 124 in FIG. 6.

As the shear drop member 114a and the shear drop member 113a are provided so as to face each other, clearance S is formed on the side of the shear drop members 113a, 114a of the abutment part 124. The clearance S is formed in an approximately V shape where the width becomes narrower toward the opposite side to the shear drop members 113a, 114a.

Next, the laser light L approximately parallel to the axis line A is emitted with the laser welding machine from the side of the shear drop members 113a, 114a to enter the abutment part 124, and the laser light enters the clearance S. Since the rear side of the clearance S is narrower, the laser light L which entered the clearance S is not reflected to the entrance direction side but proceeds to the rear side of the clearance S. With this arrangement, as it is possible to efficiently melt the abutment parts 124 with the laser light L, it is possible to firmly dissimilar-metal weld the circular disk 113 to the tooth member 114. The welded part where the welded surface 123 and the bottom surface 140a are blended with each other is formed in the entire sprocket 110 in the plate thickness direction.

A weld bead 125 in laser welding is formed along the abutment part 124. On the identical virtual circle with the axis line A as a center, the weld bead 125 is formed along the bottom surface 140a. Accordingly, upon welding, the torch of the laser welding machine is circularly moved, or the sprocket 110 is rotated about the axis line A with respect to the torch of the fixed laser welding machine. It is possible to control laser weld feeding with facility.

After the laser welding, parts of the weld bead 125 projected to the inner surface 10a and the outer surface 10b of the sprocket 110 are eliminated by machine work. Thereafter, the pair of slope parts 26, 26 are formed by machine work in the tooth member 114.

As described above, according to the second embodiment to which the present invention is applied, the respective plurality of tooth members 114 are formed as separate bodies, and welded to the circular disk 113. Accordingly, it is possible to reduce the volume of the tooth members 114 formed of ferrous material, and it is possible to reduce the weight of the sprocket 110.

Further, as the respective tooth members 114 as separate bodies are punched by stamping or press-working, it is possible to punch many tooth members 114 from one plate material, and the material yield is high.

Further, as the respective tooth members 114 are formed as separate bodies, it is possible to change the number of teeth in the sprocket 110 by changing the number of welded tooth members 114.

Further, the tooth member 114 and the circular disk 113 are formed by punching by stamping or press-working, then the tooth member 114 and the circular disk 113 are arranged in orientations such that the punching directions of stamping or press-working correspond with each other, and the laser light L is emitted from the side of the shear drop members 113a, 114a of the stamping or press-working.

With this arrangement, it is possible to prevent reflection of the laser light L entered the abutment part 124 from the side of the shear drop members 113a, 114a to the outside, and it is possible to perform welding while effectively multipath-reflecting the laser light in the abutment part 124. Accordingly, it is possible to save the welding energy and reduce the welding time.

Third Embodiment

A third embodiment to which the present invention is applied will be described below with reference to FIG. 8. In the third embodiment, elements formed as in the case of the above-described first embodiment have the same reference numerals, and the explanations thereof will be omitted.

In the above-described first embodiment, the toothed ring member 14 has the annular member 20 and the outer ring containing multiple teeth 21. In the second embodiment, the difference from the first embodiment is that the respective tooth members 114 are formed as separate bodies. Further, in the third embodiment, the difference from the first embodiment is that the welded part between a tooth member 214 and the circular disk 213 is formed to have a distance in the radial direction.

Figure 8:
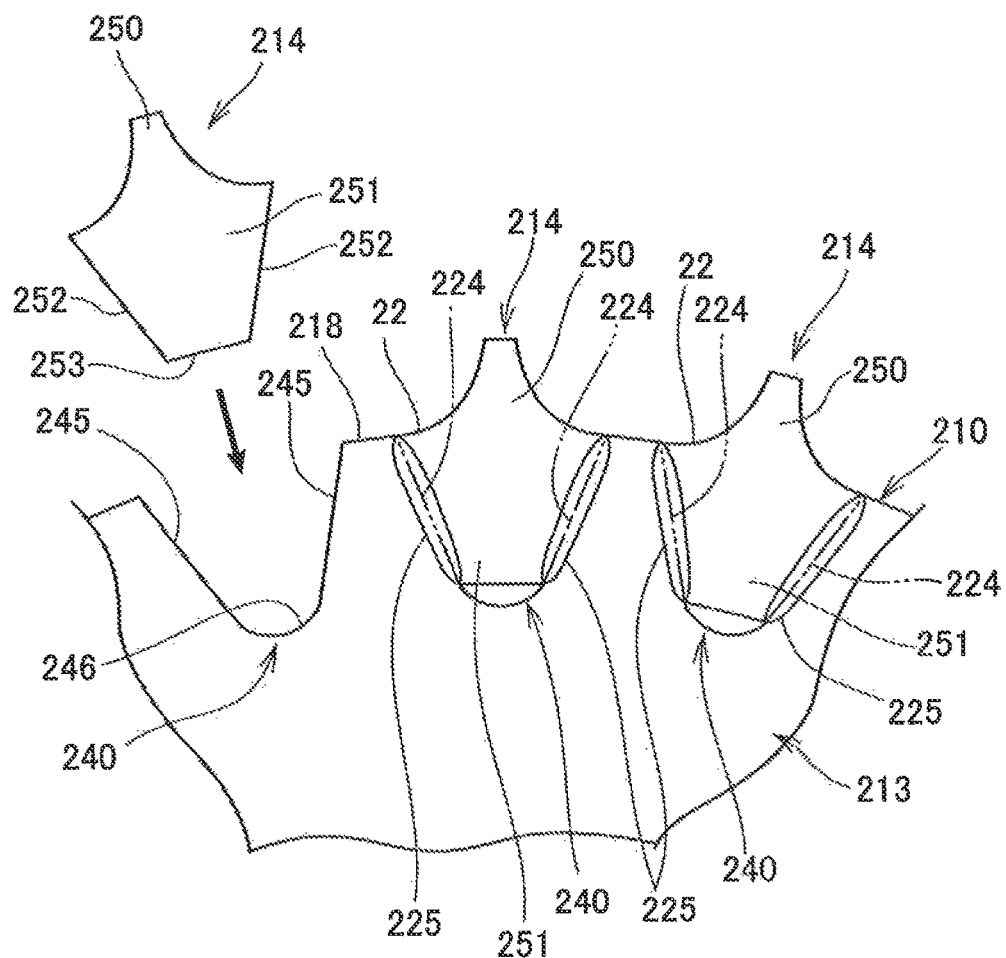
FIG. 8 is a front plan view of an enlarged part of a sprocket assembly in accordance with a third embodiment of the present invention.

FIG. 8 is a plane diagram of an enlarged part of a sprocket 210 in the third embodiment.

The sprocket 210 has a circular disk 213 and a plurality of tooth members 214 connected to the outer periphery of the circular disk 213. The circular disk 213 is formed of a light metal, and is formed of e.g., an aluminum alloy. The circular disk 213 has an outer peripheral surface 218 to which the tooth members 214 are fixed by welding. The outer peripheral surface 218 has an approximately complete round shape in a plane view, and its surface extends approximately in parallel to the axial direction of the axis line A. The circular disk 213 is formed to be the same as the circular disk 13 in the above-described first embodiment except the configuration of the outer peripheral surface 218.

The outer peripheral surface 218 has a plurality of notches 240 recessed inwardly by one step inward in the radial direction from the outermost periphery of the outer peripheral surface 218. The notches 240 are formed in a plurality of positions in the outer peripheral surface 218 over the entire periphery at approximately equal intervals in the circumferential direction, and the tooth members 214 are welded to the respective notches 240.

The notch 240 has a pair of slope surfaces 245, 245 between which the interval becomes wider toward the outside in the radial direction of the circular disk 213, and a bottom surface 246 recessed inwardly in an arc shape, and is formed in an approximately V shape in a plane view. The slope surfaces 245, 245 are surfaces extending in the radial direction of the circular disk 213, and the tooth members 214 are welded to the slope surfaces 245, 245.

The circular disk 213 is formed in a disk shape by punching a plate material by stamping or press-working. The outer peripheral surface 218 is formed by stamping or press-working.

The tooth member 214 has a tooth 250 engaged with the driving chain and an engagement member 251 fitted in the notch 240, integrally. The engagement member 251 has a pair of welded surfaces 252, 252 formed to be inclined along the slope surfaces 245, 245 of the notch 240, and an inner surface 253 to connect the ends of the welded surfaces 252, 252 in the circumferential direction.

The tooth members 214 are formed of ferrous material such as carbon steel. The respective tooth members 214 are formed by punching by stamping or press-working with a die as separate bodies.

Upon welding of the tooth member 214, first, the tooth member 214 is fitted with respect to the notch 240 of the circular disk 213, with which abutment parts 224, 224 abutted on the welded surfaces 252, 252 and the slope surfaces 245, 245 of the tooth member 214 are formed.

Next, the laser light approximately parallel to the axis line A is emitted with the laser welding machine from one direction to enter the abutment parts 224, 224, and dissimilar-metal welding is performed between the slope surfaces 245, 245 and the welded surfaces 252, 252 by laser welding. Weld beads 225, 225 (welded parts) in laser welding between the slope surfaces 245, 245 and the welded surfaces 252, 252 extend in the radial direction of the sprocket 210 along the abutment parts 224, 224, and have a distance in the radial direction of the sprocket 210.

As described above, according to the third embodiment to which the present invention is applied, as the weld beads 225, 225 as welded parts between the circular disk 213 and the tooth members 214 have a distance in the radial direction of the circular disk 213, it is possible to improve the withstand load by distributing the load on the weld beads 225, 225, and it is possible to obtain sufficient bond strength even when the weld beads 225, 225 are shortened.

Further, it is possible to receive the load in the radial direction on the tooth member 214 with the slope surfaces 245, 245 of the circular disk 213, and it is possible to improve the withstand load of the joint part.

Fourth Embodiment

A fourth embodiment to which the present invention is applied will be described below with reference to FIG. 9. In the fourth embodiment, elements formed as in the case of the above-described first embodiment have the same reference numerals, and the explanations thereof will be omitted.

In the above-described first embodiment, the toothed ring member 14 has the annular member 20 and the teeth 21. In the second embodiment, the difference from the first embodiment is that the respective tooth members 314 are formed as separate bodies. Further, in the fourth embodiment, the difference from the above-described first embodiment is that welded parts of the tooth member 314 and the circular disk 313 are formed to extend in the circumferential direction in a plurality of different positions in the radial direction.

Figure 9:
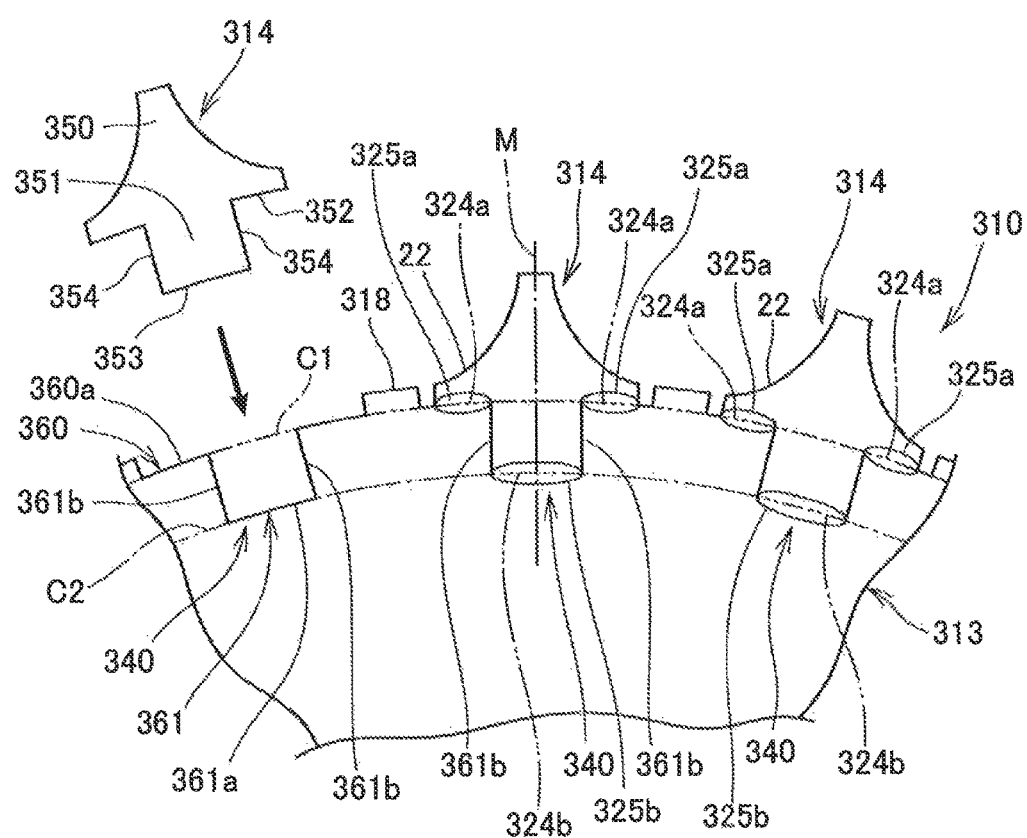
FIG. 9 is a front plan view of an enlarged part of a sprocket assembly in accordance with a fourth embodiment of the present invention.

FIG. 9 is a plane diagram of an enlarged part of a sprocket 310 in the fourth embodiment.

The sprocket 310 has the circular disk 313, and a plurality of tooth members 314 connected to the outer periphery of the circular disk 313. The circular disk 313 is formed of a light metal, and it is formed of e.g., an aluminum alloy. The circular disk 313 has an outer peripheral surface 318 to which the tooth members 314 are fixed by welding. The outer peripheral surface 318 has an approximately complete round shape in a plane view, and its surface extends approximately in parallel to the axial direction of the axis line A. The circular disk 313 is formed to be the same as the circular disk 13 in the above-described first embodiment except the configuration of the outer peripheral surface 318.

The outer peripheral surface 318 has a plurality of notches 340 recessed inwardly inward in the radial direction from the outer peripheral surface 318. The notches 340 are formed in a plurality of positions in the outer peripheral surface 318 over the entire periphery at approximately equal intervals in the circumferential direction, and the tooth members 314 are welded to the respective notches 340.

The notch 340 has an outer notch portion 360 recessed inwardly by one step in the radial direction from the outer periphery of the outer peripheral surface 318, and an inner notch portion 361 recessed inwardly by one additional step in the radial direction from the outer notch portion 360.

The outer notch portion 360 has an outer bottom surface 360*a* provided on the identical virtual circle C1 with the axis line A as a center and formed in an arc shape.

The inner notch portion 361 is formed in the central part of the outer notch portion 360 in the circumferential direction, and the outer notch portion 360, divided with the inner notch portion 361, is positioned on both sides of the inner notch portion 361 in the circumferential direction of the inner notch portion 361. The inner notch portion 361 has an inner bottom surface 361*a* provided on the identical virtual circle C2 with the axis line A as a center and is formed in an arc shape. The diameter of the virtual circle C2 is smaller than the diameter of the virtual circle C1, and the inner bottom surface 361*a* is positioned inside in the radial direction from the outer bottom surface 360*a*.

Further, the inner notch portion 361 has a pair of side surfaces 361*b*, 361*b* connecting the outer bottom surface 360*a* with the inner bottom surface 361*a*. The side surfaces 361*b*, 361*b* extend approximately in parallel to a center line M in the widthwise direction of the inner notch portion 361 passing through the axis line A.

The circular disk 313 is formed in a disk shape by punching a plate material by stamping or press-working. The outer peripheral surface 318 is formed by stamping or press-working.

The tooth member 314 has a tooth 350 having an approximately triangular shape in a plane view and an engagement member 351 fitted in the inner notch portion 361, integrally. The engagement member 351 is projected from the central part of the base of the approximately triangular-shaped tooth 350 in the opposite direction to the tooth 350. In the base of the tooth 350, the both sides of the engagement member 351 are flange-shaped outer welded surface 352 extending in the circumferential direction. The outer welded surface 352 is formed in an arc shape along the outer bottom surface 360*a* of the outer notch portion 360.

The engagement member 351 has an inner welded surface 353 which abuts on the inner bottom surface 361a of the inner notch portion 361, and a pair of engagement member side surfaces 354, 354 connecting the inner welded surface 353 with the outer welded surface 352 in the radial direction. The inner welded surface 353 is formed in an arc shape along the inner bottom surface 361a of the inner notch portion 361. The engagement member side surfaces 354, 354 are formed approximately in parallel to the side surfaces 361b, 361b of the inner notch portion 361, and fitted in the side surfaces 361b, 361b.

The tooth member 314 is formed of ferrous material such as carbon steel. The respective tooth members 314 are formed as separate bodies by punching by stamping or press-working with a die.

Upon welding of the tooth member 314, first, the tooth member 314 is fitted in the notch 340 of the circular disk 313. With this operation, an outer abutment part 324a abutted on the outer welded surface 352 and the outer bottom surface 360a, and an inner abutment part 324b abutted on the inner welded surface 353 and the inner bottom surface 361a are formed. The tooth member 314 is positioned in an appropriate position when it is fitted in the notch 340.

Next, the laser light approximately parallel to the axis line A is emitted with the laser welding machine from one direction to enter the outer abutment part 324a and the inner abutment part 324b. With this operation, the dissimilar-metal welding is performed between the outer abutment part 324a and the inner abutment part 324b by laser welding.

A weld bead 325a(welded part) in the laser welding of the outer abutment part 324a extends in the circumferential direction of the sprocket 310 along the outer abutment part 324a. A weld bead 325b(welded part) in laser welding of the inner abutment part 324b extends in the circumferential direction of the sprocket 310 along the inner abutment part 324b.

Since the weld bead 325a and the weld bead 325b are formed on the outer abutment part 324a along the virtual circle C1, and on the inner abutment part 324b along the virtual circle C2, upon welding, the torch of the laser welding machine is circularly moved, or the sprocket 310 is rotated about the axis line A with respect to the torch of the fixed laser welding machine. It is possible to control laser weld feeding with facility.

Further, the weld bead 325a and the weld bead 325b are away from each other in the radial direction of the circular disk 313, and provided to have a distance in the radial direction. Accordingly, it is possible to improve the withstand load by distributing the load on the weld beads 325a, 325b, and it is possible to obtain sufficient bond strength even when the weld beads 325a, 325b are shortened.

As described above, according to the fourth embodiment to which the present invention is applied, as the weld bead 325a and the weld bead 325b as welded parts between the circular disk 313 and tooth member 314 are formed on the virtual circle C1 and the virtual circle C2 coaxial with the sprocket 310 and having different diameters, it is possible to improve the bond strength by laser welding, and it is possible to simplify the laser weld feed direction, and to perform welding with facility.

Fifth Embodiment

A fifth embodiment to which the present invention is applied will be described below with reference to FIG. 10 and FIG. 11.

In the above-described first embodiment, the circular disk 13 is formed of a light metal, however, in the fifth embodiment, the difference from the above-described first embodiment is that a circular disk 413 has an inner circular disk 470 formed of ferrous material in its central part.

Figure 10:
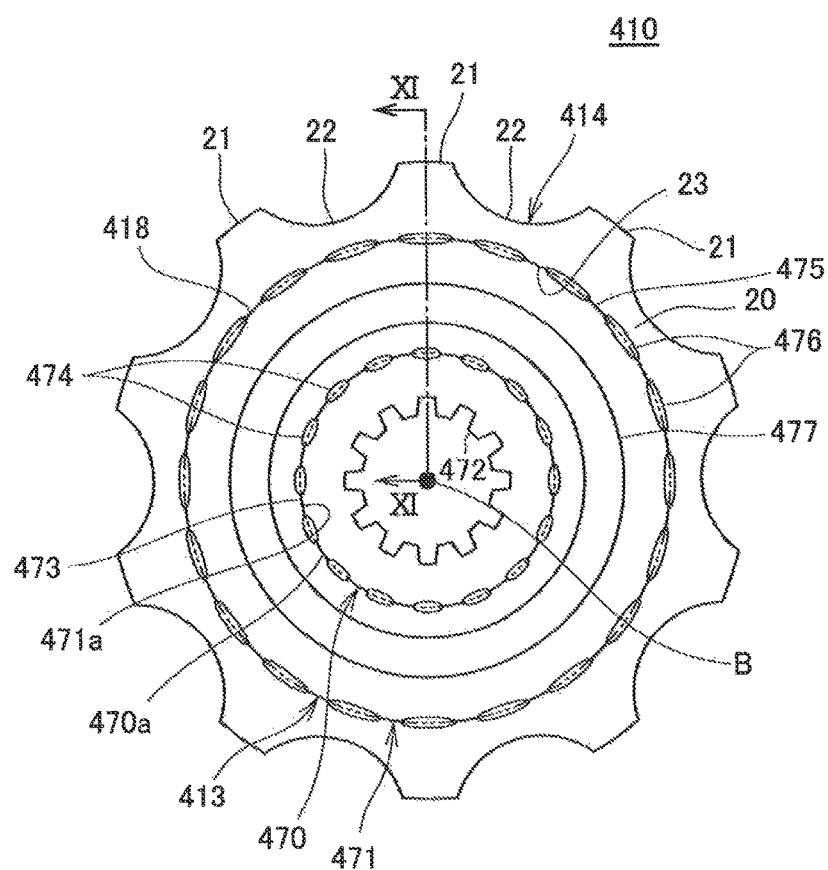
FIG. 10 is a front plan view of a sprocket assembly in accordance with a fifth embodiment of the invention.
Figure 11:
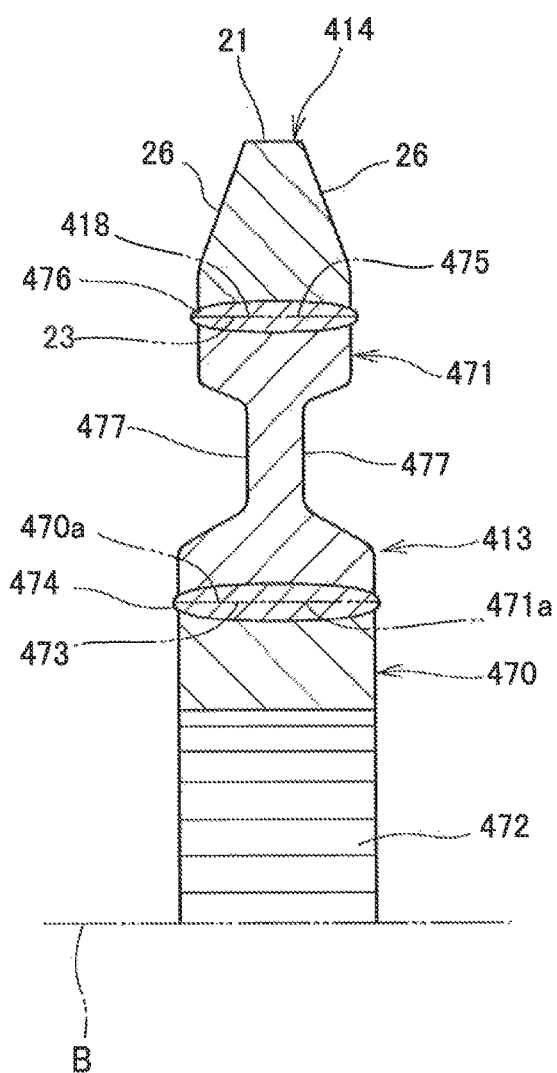
FIG. 11 is a cross-sectional detail view of the sprocket assembly of FIG. 10, taken along the line XI-XI.

FIG. 10 is a front plan view of a sprocket assembly in accordance with a fifth embodiment of the invention. FIG. 11 is a cross-sectional detail view of the sprocket assembly of FIG. 10, taken along the line XI-XI.

The sprocket 410 is a driving sprocket fixed to an engine output shaft of a motorcycle. The engine output is transmitted via a driving chain to a driven sprocket of a rear wheel.

The sprocket 410 has the circular disk 413 fixed to the engine output shaft, and an annular tooth member 414 connected to the outer periphery of the circular disk 413. The tooth member 414 is formed of ferrous material, and since it is formed as in the case of the toothed ring member 14 in the above-described first embodiment except that the number of teeth is different, elements formed as in the case of the above-described first embodiment have the same reference numerals, and the explanations thereof will be omitted.

The circular disk 413 has the inner circular disk 470 fixed by engagement with the engine output shaft, and an annular outer circular disk 471 (circular disk) connected to the outer periphery of the inner circular disk 470.

The inner circular disk 470 has a spline engagement hole 472 engaged with the engine output shaft at its center. The inner circular disk 470, having the spline engagement hole 472 to directly receive a force from the engine output shaft, is formed of high-strength ferrous material such as carbon steel. An axis line B of the sprocket 410 corresponds with the axis line of the spline engagement hole 472.

The inner circular disk 470 has an internal outer peripheral surface 470a in an approximately complete round shape in a plane view. The internal outer peripheral surface 470a extends approximately in parallel to the axial direction of the axis line B. The outer circular disk 471 is welded to the internal outer peripheral surface 470a.

The outer circular disk 471 has an inner peripheral surface 471a engaged with the internal outer peripheral surface 470a, and an outer peripheral surface 418 engaged with the inner peripheral surface 23 of the toothed ring member 14. The outer circular disk 471 has an annular dent 477 which has an annular shape in a plane view and which is recessed inwardly in the plate thickness direction in the central part in the radial direction. The dent 477 is respectively formed in the front and rear sides of the outer circular disk 471. The inner peripheral surface 471a and the outer peripheral surface 418 extend approximately in parallel to the axial direction of the axis line B.

The outer circular disk 471 is formed of a light metal, and is formed of e.g., an aluminum alloy. Further, the outer circular disk 471 is formed in a disk shape by punching a plate material by stamping or press-working.

Upon laser welding between the outer circular disk 471 and the inner circular disk 470, the outer circular disk 471 is engaged with the inner circular disk 470, with which an inner abutment part 473 abutted on the inner peripheral surface 471a and the internal outer peripheral surface 470a is formed. When laser light approximately in parallel to the axis line B is emitted with the laser welding machine from one direction on the inner abutment part 473, the inner abutment part 473 is dissimilar-metal welded by laser welding. A weld bead 474 in laser welding of the inner abutment part 473 is formed in a plurality positions at approximately equal intervals in the circumferential direction.

Note that the weld bead 474 may be continuously formed over the entire periphery of the inner abutment part 473.

Upon laser welding between the outer circular disk 471 and the tooth member 414, the tooth member 414 is engaged with the outer circular disk 471, with which an outer abutment part 475 abutted on the inner peripheral surface 23 and the outer peripheral surface 418 is formed. When laser light approximately parallel to the axis line B is emitted with the laser welding machine from one direction on the outer abutment part 475, the outer abutment part 475 is dissimilar-metal welded by laser welding. A weld bead 476 in laser welding of the outer abutment part 475 is formed in a plurality of positions at approximately equal intervals in the circumferential direction.

Note that the weld bead 476 may be continuously formed over the entire periphery of the outer abutment part 475.

According to the fifth embodiment, the circular disk 413, having the spline engagement hole 472 requiring high strength, has the inner circular disk 470 of ferrous material with the spline engagement hole 472, and the outer circular disk 471 of a light metal connected to the internal outer peripheral surface 470a of the inner circular disk 470, and the tooth member 414 of ferrous material is laser welded to the outer peripheral surface 418 of the outer circular disk 471. Accordingly, it is possible to reduce the weight of the sprocket 410 while ensuring the strength of the spline engagement hole 472 and the tooth member 414.

Note that the above-described embodiments merely show an aspect to which the present invention is applied, and the present invention is not limited to the above-described embodiments.

In the above-described first to fifth embodiments, the sprocket 10, 110, 210, 310, 410 is dissimilar-metal welded by laser welding, however, the present invention is not limited to this welding, but the sprocket may be dissimilar-metal welded by electronic beam welding having a property similar to that of the laser welding. Further, in the above-described first to fifth embodiment, the circular disk 13, 113, 213, 313, the outer circular disk 471, and the toothed ring member 14, 114, 214, 314, 414 are formed by punching by stamping or press-working, however, the processing is not limited to this stamping or press-working but the tooth member may be formed by other processing such as cutting work or metal casting.

Further, in the above-described second embodiment, the laser light L is emitted from the side of the shear drop members 113a, 114a in the stamping or press-working. The method may be applied to the above-described first, third to fifth embodiments.

Further, in the above-described first to fifth embodiments, the sprocket 10, 110, 210, 310, 410 is used in a motorcycle, however, the present invention is not limited to the motorcycle. It is applicable to various vehicles such as a bicycle, a three-wheeled vehicle, a motor car having four or more wheels, industrial machines and the like.

REFERENCE SIGNS LIST 10, 110, 210, 310, 410 . . . Sprocket
13, 113, 213, 313 . . . Circular disk
14, 114, 214, 314, 414 . . . Tooth member
18, 118, 218, 318, 418 . . . Outer peripheral surface
113a . . . Shear drop member (shear drop)
114a . . . Shear drop member (shear drop)
225 . . . Weld bead (welded part)
325a, 325b . . . Weld bead (welded part)
471 . . . Outer circular disk (circular disk)
C1 . . . Virtual circle (circle coaxial, having mutually different diameters)
C2 . . . Virtual circle (circle coaxial, having mutually different diameters)

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A sprocket comprising:
a tooth member including one or more teeth formed of an iron-based material; and
a circular disk that is formed of a light metal and that supports the tooth member thereon,
wherein the tooth member is abutted on an outer peripheral surface of the circular disk, and is dissimilar-metal welded to the circular disk by laser welding or electronic beam welding in which a laser or electronic beam enters a clearance between circular disk and the tooth member, said welding using only materials of the circular disk and the tooth member,
wherein a weld bead, having a thickness in a radial direction of the circular disk, is formed internally inside of the sprocket at the clearance between the circular disk and the tooth member, and the iron-based material of the tooth member and the light metal of the circular disk are blended together in the weld bead.

2. The sprocket according to claim 1, comprising more than one said tooth member provided in a plurality of positions, wherein each of the tooth members is formed as a separate body, and welded to the circular disk.

3. The sprocket according to claim 2, wherein a welded junction between the circular disk and the tooth member has a distance in a radial direction of the circular disk.

4. The sprocket according to claim 3, wherein welded parts between the circular disk and the tooth member are formed on a plurality of circles which are coaxial to the sprocket and which have mutually different diameters.

5. The sprocket according to claim 2, wherein welded parts between the circular disk and the tooth member are formed on a plurality of circles which are coaxial to the sprocket and which have mutually different diameters.

6. The sprocket according to claim 2, wherein:
the tooth member and the circular disk are punched out by press working;
the tooth member and the circular disk are arranged in orientations in which punching directions in the press working correspond with each other; and
the laser or electronic beam is emitted from a side of shear drops in the press working.

7. The sprocket according to claim 1, wherein a welded junction between the circular disk and the tooth member has a distance in a radial direction of the circular disk.

8. The sprocket according to claim 7, wherein welded parts between the circular disk and the tooth member are formed on a plurality of circles which are coaxial to the sprocket and which have mutually different diameters.

9. The sprocket according to claim 7, wherein:
the tooth member and the circular disk are punched out by press working;

the tooth member and the circular disk are arranged in orientations in which punching directions in the press working correspond with each other; and the laser or electronic beam is emitted from a side of shear drops in the press working.

10. The sprocket according to claim 1, wherein welded parts between the circular disk and the tooth member are formed on a plurality of circles which are coaxial to the sprocket and which have mutually different diameters.

11. The sprocket according to claim 10, wherein:

the tooth member and the circular disk are punched out by press working;

the tooth member and the circular disk are arranged in orientations in which punching directions in the press working correspond with each other; and the laser or electronic beam is emitted from a side of shear drops in the press working.

12. The sprocket according to claim 1, wherein:

the tooth member and the circular disk are punched out by press working;

the tooth member and the circular disk are arranged in orientations in which punching directions in the press working correspond with each other; and the laser or electronic beam is emitted from a side of shear drops in the press working.

13. The sprocket according to claim 1, wherein:

the tooth member comprises an annular member having a plurality of the teeth integrally formed thereon; and the tooth member is formed in an annular shape by punching a plate material by one of stamping and press-working.

14. The sprocket according to claim 13, wherein:

the circular disk is formed in a disk shape by punching a plate material with a die by one of stamping and press-working; and and plate thickness of the tooth member is substantially equal to plate thickness of the circular disk.

15. The sprocket according to claim 14, wherein a number of the weld beads corresponds to a number of the teeth.

16. A sprocket comprising:

a plurality of individual teeth formed of a ferrous material; and a circular disk that is formed of a light metal and that supports the teeth thereon, the circular disk having an outer periphery with a plurality of spaced-apart notches therein;

wherein each of the teeth is configured to fit into one of the notches, and is abutted into said one of the notches on an outer peripheral surface of the circular disk, and is dissimilar-metal welded to the circular disk by laser welding or by electronic beam welding in which a laser or electronic beam enters a clearance between each of the teeth and the circular disk, said welding using only materials of the circular disk and the teeth, and wherein a weld bead is formed internally inside of the sprocket between the circular disk and each of the plurality of individual teeth, and the ferrous material of the teeth and the light metal of the circular disk are blended together in the weld bead.

17. The sprocket according to claim 16, wherein welded parts between the circular disk and the each of the teeth are formed on a plurality of circles which are coaxial to the sprocket and which have mutually different diameters.

18. The sprocket according to claim 16, wherein:

the teeth and the circular disk are punched out by press working;

the teeth and the circular disk are arranged in orientations in which punching directions in the press working correspond with each other; and the laser or electronic beam is emitted from a side of shear drops in the press working.

19. A method of making a sprocket, comprising the steps of:

fitting a tooth member including one or more teeth and formed from a ferrous material into abutting relation with an outer peripheral portion of a circular disk formed from a light metal comprising aluminum, in a manner such that punching directions of stamping or press-working of the tooth member and the circular disk correspond with each other; and welding the tooth member to the circular disk by laser welding or by electronic beam welding in which a laser or electronic beam enters a clearance between the tooth member and the circular disk, said welding using only materials of the circular disk and the tooth member in a manner such that a weld bead, having a thickness in a radial direction of the circular disk, is formed internally inside of the sprocket at the clearance between the circular disk and the tooth member, and the ferrous material of the tooth member and the light metal of the circular disk are blended together in the weld bead.

20. The method of making a sprocket according to claim 19, wherein a number of the weld beads corresponds to a number of the teeth.

* * * * *